US008157566B2

(12) United States Patent
Tsai et al.

(10) Patent No.: US 8,157,566 B2
(45) Date of Patent: Apr. 17, 2012

(54) ADJUSTABLE HIERARCHICAL SCORING METHOD AND SYSTEM

(75) Inventors: Te-Lu Tsai, Taipei (TW); Jyh-Shing Jang, Taipei (TW); Yu-Shiang Hung, Taipei (TW); Tzu-Chieh Tien, Taoyuan County (TW)

(73) Assignee: Institute For Information Industry, Taipei (TW)

( * ) Notice: Subject to any disclaimer, the term of this patent is extended or adjusted under 35 U.S.C. 154(b) by 702 days.

(21) Appl. No.: 12/344,848

(22) Filed: Dec. 29, 2008

(65) Prior Publication Data

US 2010/0151427 A1 Jun. 17, 2010

(51) Int. Cl.
*G09B 19/00* (2006.01)
*G09B 17/00* (2006.01)

(52) U.S. Cl. ........ 434/156; 434/178; 434/185; 434/319; 434/322; 434/350

(58) Field of Classification Search .................. 434/353, 434/335, 307 R, 323, 350
See application file for complete search history.

(56) References Cited

U.S. PATENT DOCUMENTS

| | | | | |
|---|---|---|---|---|
| 5,280,563 A * | 1/1994 | Ganong | ........................ | 704/200 |
| 5,848,384 A * | 12/1998 | Hollier et al. | .................. | 704/231 |
| 6,785,650 B2 * | 8/2004 | Basson et al. | .................. | 704/235 |
| 6,816,836 B2 * | 11/2004 | Basu et al. | ..................... | 704/270 |
| 6,953,343 B2 * | 10/2005 | Townshend | ................. | 434/178 |
| 6,985,862 B2 * | 1/2006 | Strom et al. | .................. | 704/255 |
| 7,831,196 B2 * | 11/2010 | Attali et al. | ..................... | 434/353 |
| 2007/0124147 A1 * | 5/2007 | Gopinath et al. | ............. | 704/257 |
| 2007/0218450 A1 * | 9/2007 | MacClay et al. | .............. | 434/353 |
| 2008/0124696 A1 * | 5/2008 | Houser et al. | .................. | 434/350 |
| 2008/0221903 A1 * | 9/2008 | Kanevsky et al. | ............ | 704/275 |
| 2009/0176198 A1 * | 7/2009 | Fife et al. | ....................... | 434/353 |
| 2009/0192808 A1 * | 7/2009 | Sela | ................................. | 705/1 |
| 2009/0197225 A1 * | 8/2009 | Sheehan et al. | ............... | 434/169 |
| 2009/0258333 A1 * | 10/2009 | Yu | .................................. | 434/157 |
| 2010/0010802 A1 * | 1/2010 | Ruano et al. | ...................... | 704/9 |
| 2010/0088162 A1 * | 4/2010 | Zeng et al. | ...................... | 705/11 |

* cited by examiner

*Primary Examiner* — Kang Hu
(74) *Attorney, Agent, or Firm* — Thomas|Kayden (57) ABSTRACT

An adjustable hierarchical scoring method is disclosed. A hierarchical scoring structure for speech-sound data is generated. Historical data of speech-sound scoring for the speech-sound data is retrieved from a speech-sound practice database while a professional scoring result for the hierarchical scoring structure of the speech-sound data is being collected. A weight-adjusting operation is performed according to the historical data of speech-sound scoring and the professional scoring result to calculate optimum adjusting weights for each layer of the hierarchical scoring structure. Retrieved speech-sound data of a student is scored using a speech-sound scoring system and a weighted average operation is performed to the score of the speech-sound data of the student according to a corresponding adjusting weight, thereby generating the final score of the speech-sound data of the student.

7 Claims, 7 Drawing Sheets

FIG. 1

| uo(我) | | huei(會) | | | shuo(說) | | | i(一) | dien(點) | | | zhong(中) | | | un(文) | |
|---|---|---|---|---|---|---|---|---|---|---|---|---|---|---|---|---|
| u | o | h | u | e | i | sh | u | o | i | d | i | e | n | zh | o | ng | u | n |
| 73 | 85 | 88 | 72 | 75 | 80 | 92 | 85 | 78 | 98 | 32 | 44 | 83 | 77 | 71 | 78 | 87 | 83 | 92 |

FIG. 4A $$\begin{bmatrix} & a1 & a2 & a3 & b1 & b2 & b3 \\ \text{Student 1} & 84 & 94 & 83 & 65 & 95 & 34 \\ \text{Student 2} & 73 & 65 & 69 & 81 & 82 & 30 \\ \text{Student 3} & 21 & 72 & 21 & 82 & 79 & 38 \\ \text{Student 4} & 65 & 82 & 91 & 59 & 89 & 28 \\ \text{Student 5} & 56 & 28 & 81 & 84 & 99 & 31 \\ \text{Student 6} & 92 & 20 & 93 & 58 & 60 & 57 \\ \text{Student 7} & 43 & 63 & 81 & 36 & 70 & 83 \\ \text{Student 8} & 25 & 21 & 50 & 66 & 83 & 42 \\ \text{Student 9} & 58 & 56 & 46 & 73 & 56 & 38 \\ \text{Student 10} & 99 & 36 & 60 & 74 & 62 & 93 \end{bmatrix} \begin{bmatrix} 0.3100 & 0 \\ 0.4200 & 0 \\ 0.2700 & 0 \\ 0 & 0.5100 \\ 0 & 0.2500 \\ 0 & 0.2600 \end{bmatrix} \begin{bmatrix} 0.3510 \\ 0.6490 \end{bmatrix} = \begin{bmatrix} 56 \\ 83 \\ 65 \\ 58 \\ 81 \\ 47 \\ 55 \\ 74 \\ 68 \\ 56 \end{bmatrix} + e$$

ADJUSTABLE HIERARCHICAL SCORING METHOD AND SYSTEM

BACKGROUND OF THE INVENTION

1. Field of the Invention

The invention relates to speech-sound scoring software, and more particularly to an adjustable hierarchical scoring method and system thereof.

2. Description of the Related Art

When studying languages, it is hard for students to discriminate between languages and learn new languages due to similar pronunciations. Thus, most students generate different pronunciations when compared to standard pronunciations.

Referring to TW Patent No. 200515368, a speech-sound scoring system is disclosed, comprising a functional selecting module, a data providing module, a professional system, a speech-sound recognition unit, a speech-sound-feature resembling database, and a database. The data providing module allows a user to select training materials for pronunciation practice. When the user pronounces the pronunciation provided by the training material, the speech-sound recognition unit compares the pronunciation with a speech-sound model and outputs a comparison result. The professional system analyzes pronunciation data based on the comparison result, stores the pronunciation data and incorrect pronunciation information from the user in the database, provides pronunciation suggestions for the user and enables the user to track historical results when trying to improve their pronunciation.

However, scoring results scored by conventional speech-sound scoring methods and systems are substantially different from professional scoring results scored by professional language instructors. Thus, students with high scores according to conventional speech-sound scoring systems, may not score high when tested by professional language instructors. Therefore, conventional speech-sound scoring methods and systems comprise practical deficiencies.

BRIEF SUMMARY OF THE INVENTION

An object of the present invention provides an adjustable hierarchical scoring method and system. When students are being scored for language ability, scores provided by the adjustable hierarchical scoring method and system of the invention more closely resembles scores that may be provided by professional language instructors.

Adjustable hierarchical scoring methods are provided. An exemplary embodiment of an adjustable hierarchical scoring method comprises the following. A hierarchical scoring structure for speech-sound data is generated. Historical data of speech-sound scoring for the speech-sound data is retrieved from a speech-sound practice database while a professional scoring result for the hierarchical scoring structure of the speech-sound data is being collected. A weight-adjusting operation is performed according to the historical data of speech-sound scoring and the professional scoring result to calculate optimum adjusting weights for each layer of the hierarchical scoring structure. Retrieved speech-sound data of a student is scored using a speech-sound scoring system. A weighted average operation is performed to the score of the speech-sound data of the student according to a corresponding adjusted weight, thereby generating the adjusted score of the speech-sound data of the student.

Adjustable hierarchical scoring systems are provided. An exemplary embodiment of an adjustable hierarchical scoring system comprises a speech-sound scoring system, a speech-sound practice database, a weight database, a score input interface, a hierarchical weight-adjusting module, and a hierarchical weighting and scoring module. The speech-sound scoring system scores retrieved speech-sound data of a student. The speech-sound practice database stores historical data for the speech-sound data scored by the speech-sound scoring system. The weight database stores calculated adjusted weights. The score input interface retrieves a professional scoring result for a hierarchical scoring structure of the speech-sound data. The hierarchical weight-adjusting module retrieves the historical data of speech-sound scoring for the speech-sound data from the speech-sound practice database and simultaneously collects the professional scoring result for the hierarchical scoring structure of the speech-sound data, performs a weight-adjusting operation according to the historical data of speech-sound scoring and the professional scoring result to calculate optimum adjusting weights for each layer of the hierarchical scoring structure, and transmits the calculated adjusted weights to the weight database. When speech-sound data of a student is retrieved, the hierarchical weighting and scoring module scores the retrieved speech-sound data of the student using the speech-sound scoring system, selects an adjusted weight corresponding to the speech-sound data of the student from the weight database, and performs a weighted average operation to the score of the speech-sound data of the student according to the selected adjusted weight, thereby generating the adjusted score of the speech-sound data of the student.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 6, which generally relate to adjustable hierarchical scoring. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an adjustable hierarchical scoring method and system.

An embodiment of the adjustable hierarchical scoring method and system introduces subject scores so that scores may more closely resemble scores that may be provided by professional language instructors. Additionally, scores for sentences, words, syllables, and phonemes can be separately generated to explain why high or low scores were generated.

Figure 1:
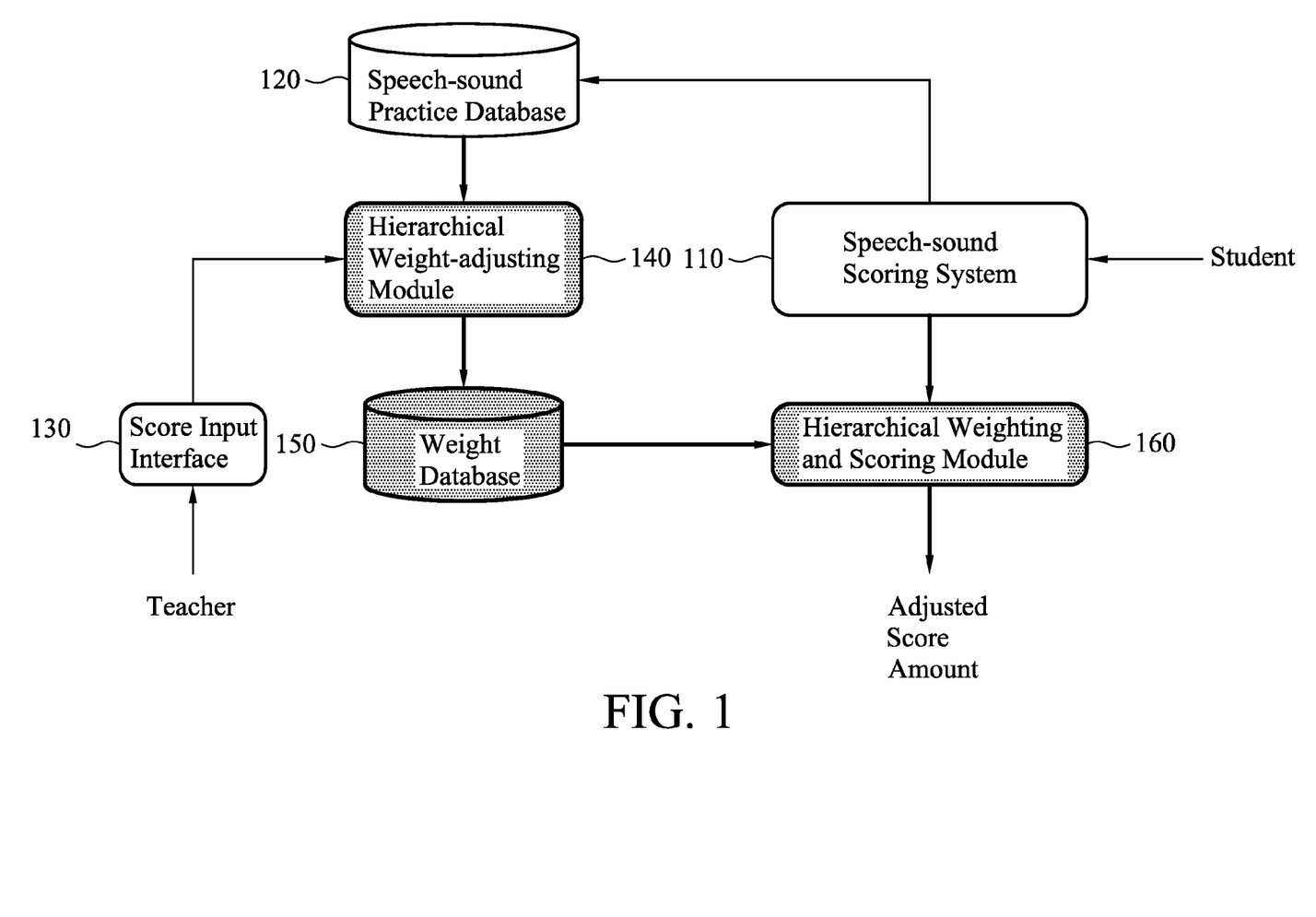
FIG. 1 is a schematic view of an adjustable hierarchical scoring system of the present invention.

FIG. 1 is a schematic view of an adjustable hierarchical scoring system of the present invention.

An exemplary embodiment of an adjustable hierarchical scoring system comprises a speech-sound scoring system 110, a speech-sound practice database 120, a score input interface 130, a hierarchical weight-adjusting module 140, a weight database 150, and a hierarchical weighting and scoring module 160. The speech-sound scoring system 110 further comprises a recording interface (not shown), a calculation module for a monosyllable score (not shown), and so on for performing conventional scoring operations, which are not further described herein.

Figure 2:
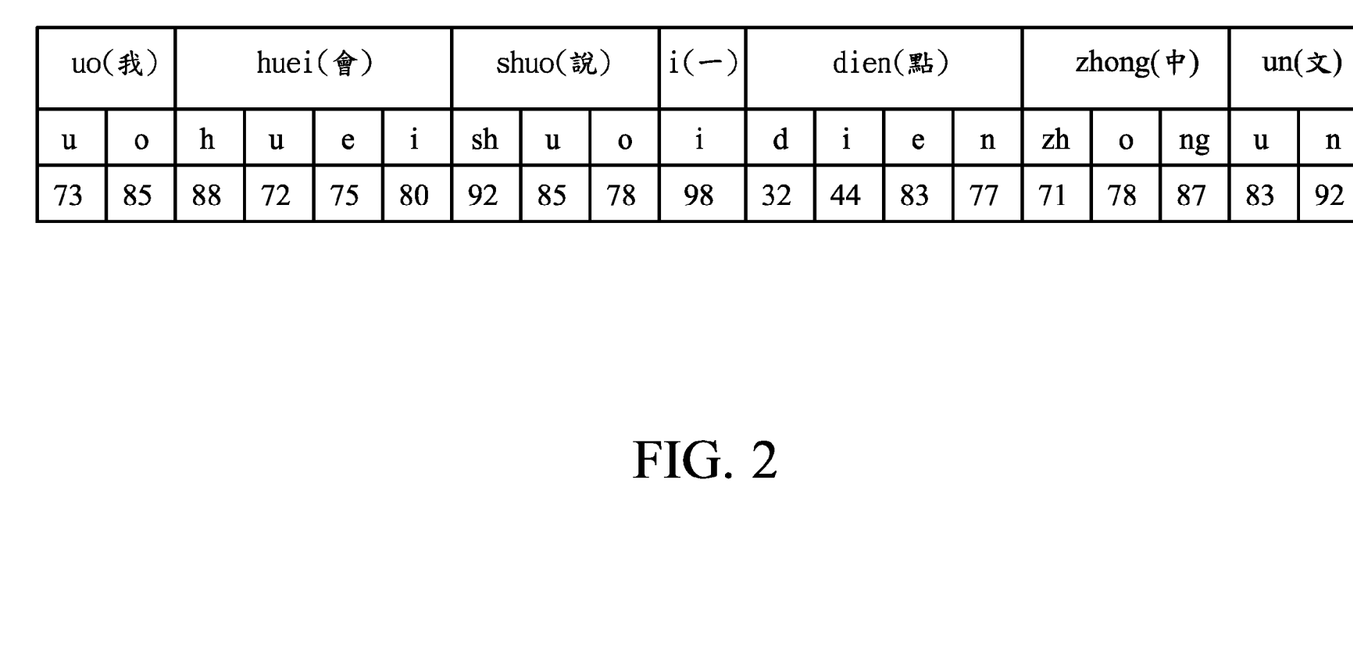
FIG. 2 is a schematic view of speech-sound scoring by a speech-sound scoring system of the present invention.

The speech-sound practice database 120 stores historical data for speech-sound data. That is to say, a student pronounces a written language and the speech-sound scoring system 110 scores sentences, words, syllables, and phonemes of the written language to obtain corresponding scoring results of speech-sound data (as shown in FIG. 2) and stores the scoring results in the speech-sound practice database 120.

Figure 3:
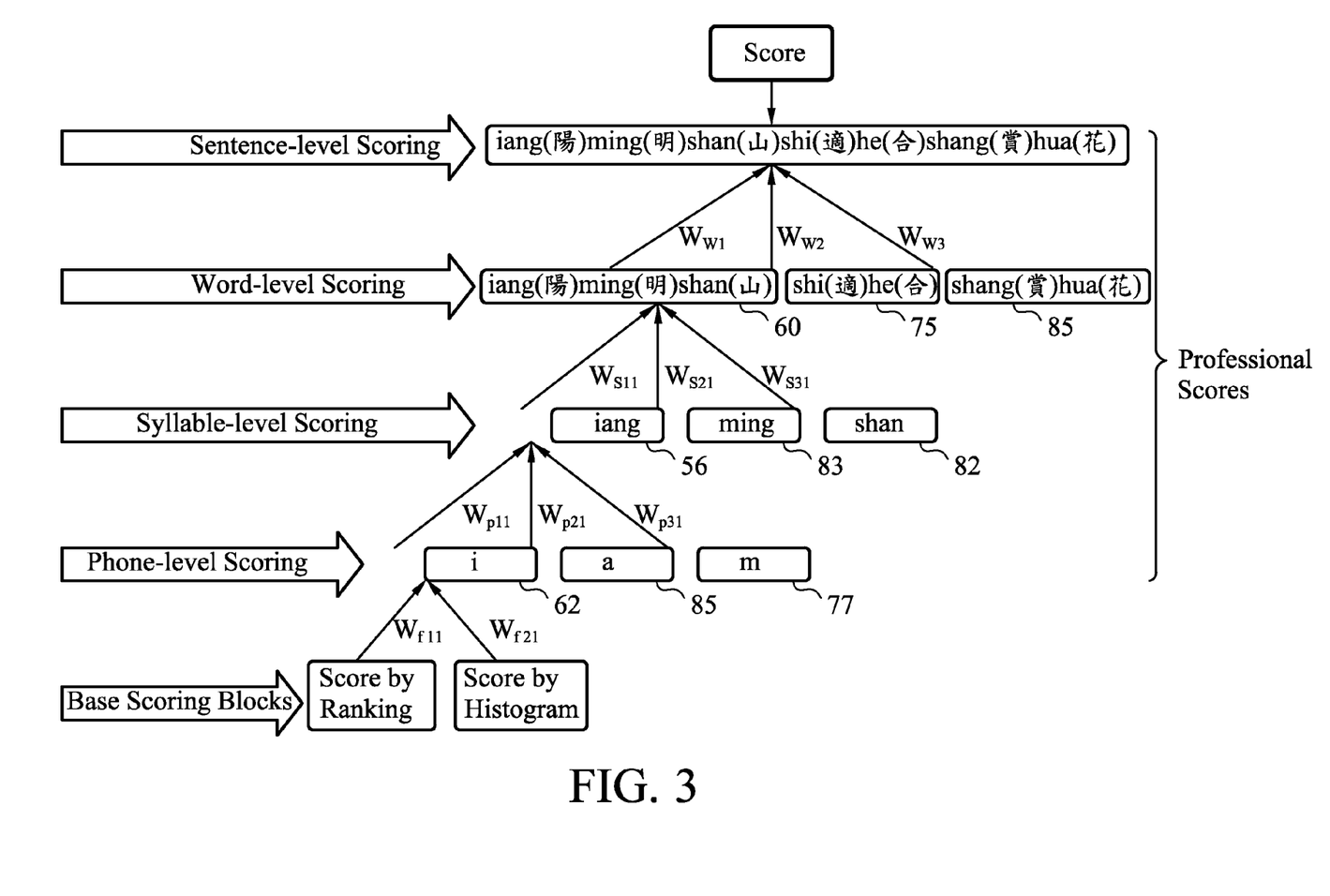
FIG. 3 is a schematic view of hierarchical scoring of the present invention.

When a scoring process of the invention starts, the hierarchical weight-adjusting module 140 retrieves historical data of speech-sound scoring for speech-sound data from the speech-sound practice database 120 while a professional scoring result for the written language (i.e. professional scores for the sentences, words, syllables, and phonemes of the written language) is being collected via the score input interface 130, as shown in FIG. 3. In FIG. 2 and FIG. 3, Chinese language characters are show as parenthetical expressions, which accompanying English language text.

The hierarchical weight-adjusting module 140 performs a weight-adjusting operation according to the historical data of speech-sound scoring and the professional scoring result (comprising phone-level scoring, syllable-level scoring, word-level scoring, and sentence-level scoring), calculates optimum adjusted weights of the speed-sound data of the i-th layer using an iterative least-squares method and transmits the calculated adjusted weights (i.e. adjusted weights corresponding to each of the sentences, words, syllables, and phonemes) to the weight database 150.

When speech-sound data of a student is retrieved from the speech-sound scoring system 110, the hierarchical weighting and scoring module 160 calculates each monosyllable score of the speech-sound data of the student and retrieves corresponding adjusted weights from the weight database 150 to perform a weighted average operation, thereby generating the adjusted score of the speech-sound data of the student.

Note that the method of the invention calculates optimum adjusted weights of speed-sound data for the i-th layer (if a hierarchical scoring structure comprises i layers) using, but is not limited to, the iterative least-squares method. Thus, when a weighting of current speed-sound data is converged, the weight is the optimum adjusted weight of the speed-sound data. The invention focuses on calculating adjusted weights for adjusting scores of the student based on historical scoring results and professional scoring results of a language instructor, enabling a student's scores to more closely resemble a language instructor's scores, so any weight calculating methods can be used to implement the invention.

An example of the invention is described in the following.

Figure 4A:
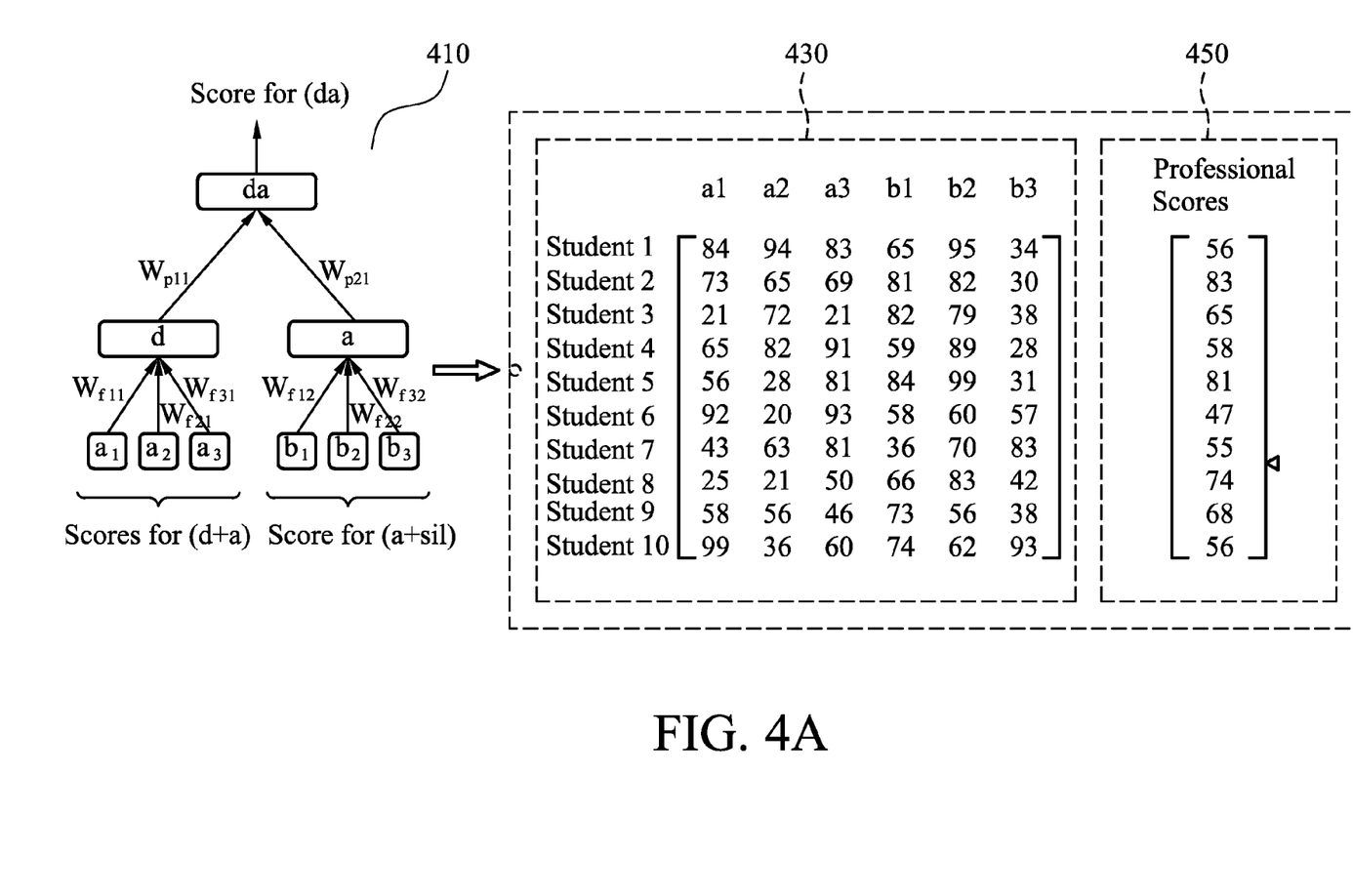
FIGS. 4A and 4B are schematic views of adjustable hierarchical scoring of the present invention.

Referring to speech-sound data (da) of FIG. 4A, a hierarchical speech-sound scoring structure 410 is generated and scoring data, comprising scoring data 430 of a student and scoring data 450 of a language instructor, corresponding to the hierarchical speech-sound scoring structure 410 is collected.

Figure 4B:
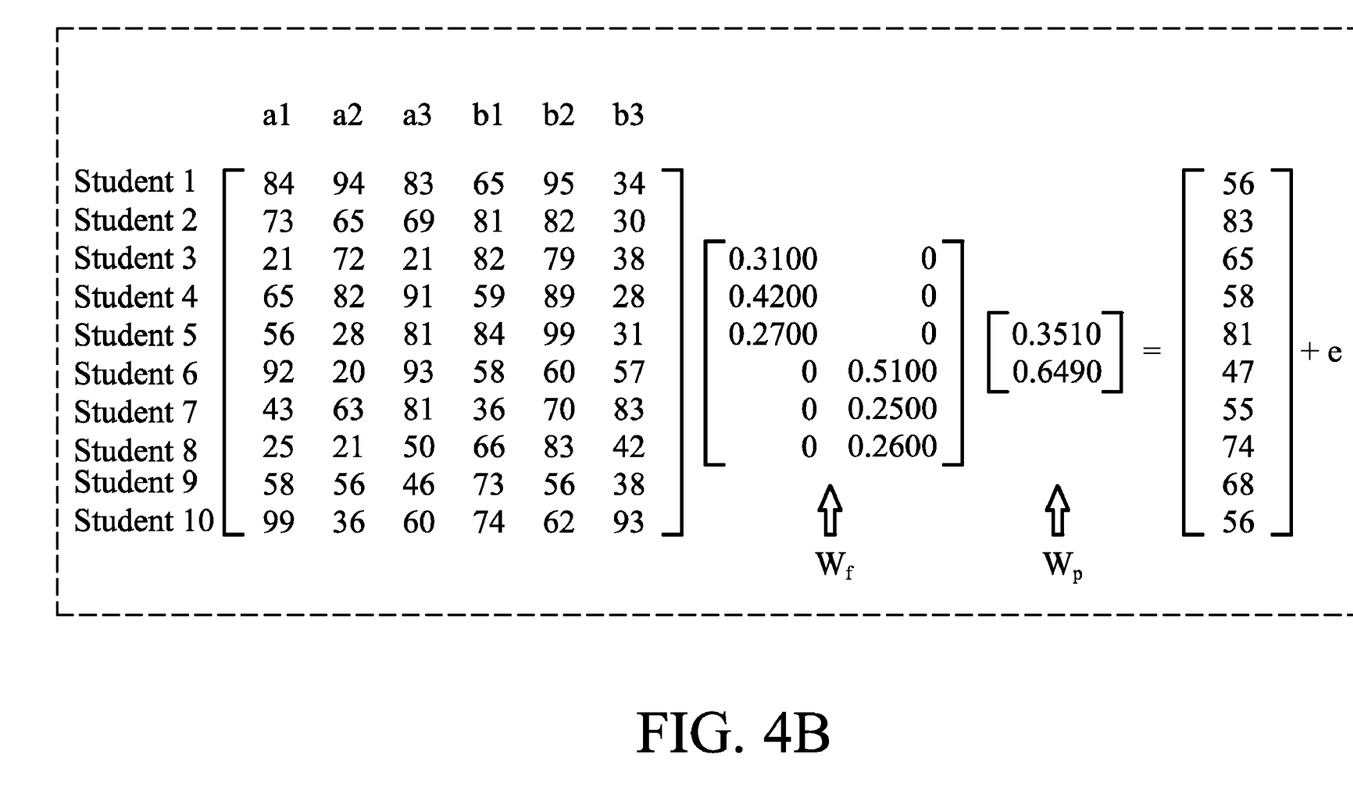

Next, optimum weights of each layer of the hierarchical speech-sound scoring structure 410 are calculated using an iterative least-squares method. Referring to FIG. 4B, convergence occurs when |e|=16.59, so weights $W_f$ and $W_p$ are obtained, including $W_{p11}, W_{p21}, W_{f11}, W_{f21}, W_{31}, W_{f12}, W_{f22}$, and $W_{f32}$, as shown in FIG. 4A. The obtained weights are transmitted to a weight database. The described steps are repeated to calculate optimum weights of all speed-sound data and the weights are transmitted to the weight database. Thus, the speech-sound scoring system has been completely reconfigured when the professional scores are introduced therein.

When speech-sound data of the student is retrieved, the speech-sound scoring system of the invention performs a weighted average operation to each monosyllable score based on corresponding weights to obtain the final adjusted score. The score amount of the speech-sound data (da) is represented as:

$$s_{da}=(s_{d_1}w_{f11}+s_{d_2}w_{f21}+s_{d_3}w_{f31})w_{p11}+(s_{a_1}w_{f12}+s_{a_2}w_{f22}+s_{a_3}w_{f32})w_{p21}.$$

Figure 5:
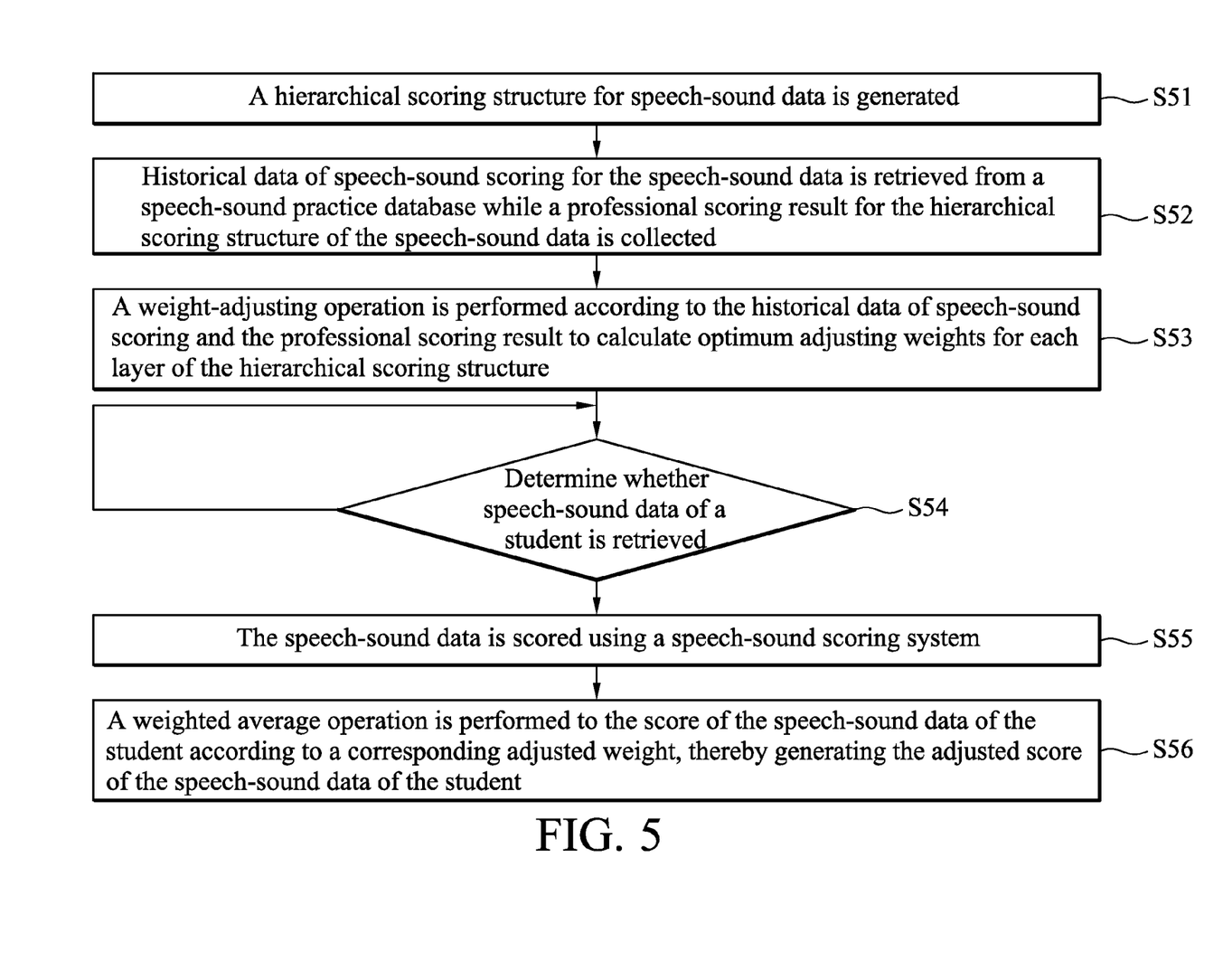
FIG. 5 is a flowchart of an adjustable hierarchical scoring method of the present invention.

FIG. 5 is a flowchart of an adjustable hierarchical scoring method of the present invention.

A hierarchical scoring structure for speech-sound data is generated (step S51). Historical data of speech-sound scoring for the speech-sound data is retrieved from a speech-sound practice database while a professional scoring result for the hierarchical scoring structure of the speech-sound data is being collected (step S52). A weight-adjusting operation is performed according to the historical data of speech-sound scoring and the professional scoring result to calculate optimum adjusting weights (when convergence occurs) for each layer of the hierarchical scoring structure (step S53).

It is determined whether speech-sound data of a student has been retrieved (step S54). When the speech-sound data of the student is determined to have been retrieved, the speech-sound data is scored using a speech-sound scoring system (step S55) and a weighted average operation is performed to the score of the speech-sound data of the student according to a corresponding adjusted weight, thereby generating the adjusted score of the speech-sound data of the student (step S56).

Figure 6:
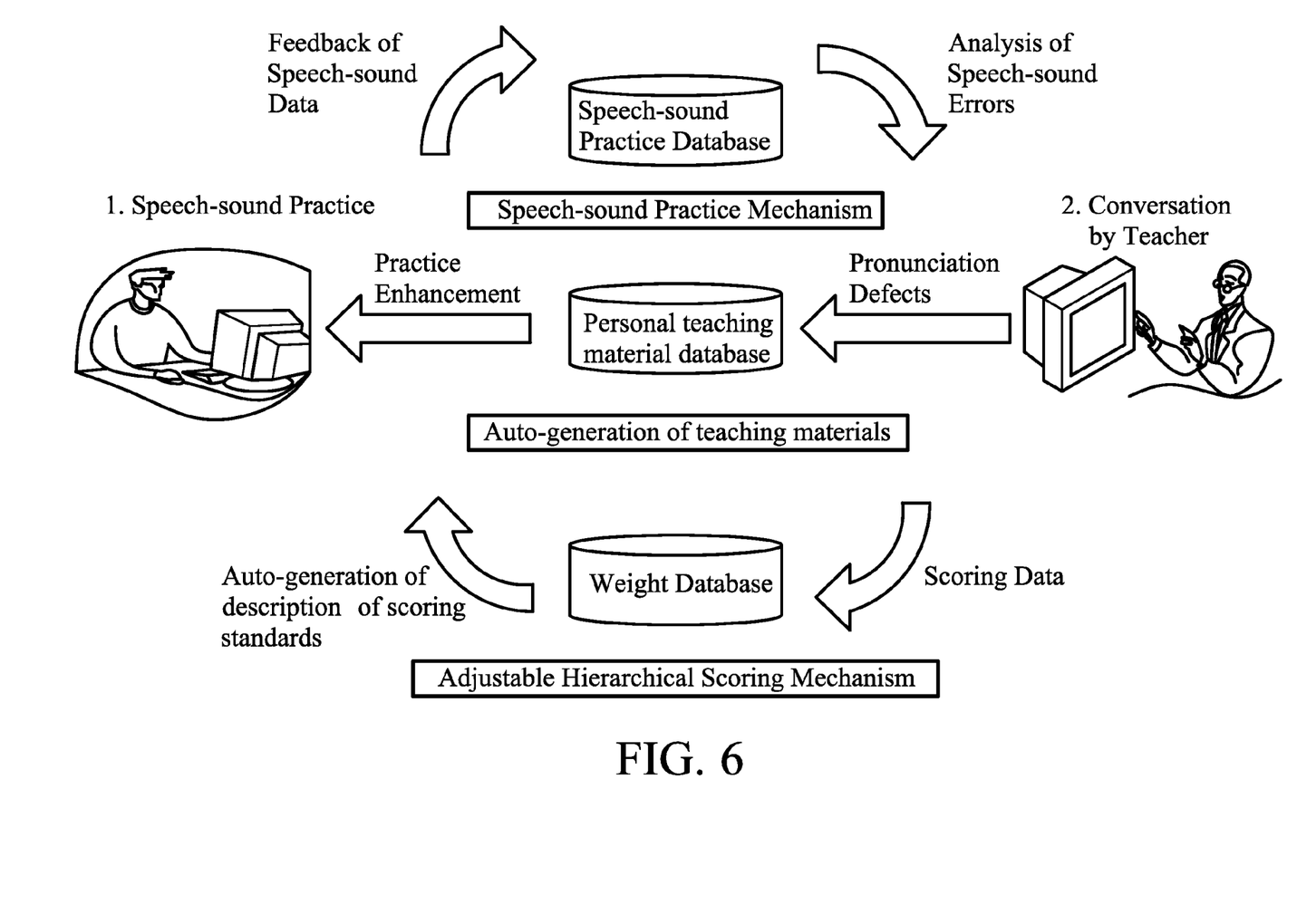
FIG. 6 is a schematic view of a feedback service of speech-sound training of the present invention.

FIG. 6 shows a feedback service of speech-sound training of the present invention. The adjustable hierarchical scoring mechanism of the present invention provides advantageous comprising: (1) enabling the score of a student scored by the scoring system to approach professional scores by: a language instructor; (2) the language instructor may influence the scoring system based on sentence scoring, word scoring, and character scoring provided by the language instructor; (3) automatically generating descriptions of scoring criterion (weights of consonants and vowels, for example) to rapidly find problem pronunciation areas; and (4) increasing adjusted parameters of tones of different accents or regions for wider application.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adjustable hierarchical scoring method, used in an adjustable hierarchical scoring system comprising a processor to perform the following steps of:
   generating a hierarchical scoring structure for speech-sound data;
   retrieving historical data of speech-sound scoring for the speech-sound data from a speech-sound practice database while a scoring result by a professional language instructor for the hierarchical scoring structure of the speech-sound data is being collected;
   performing a weight-adjusting operation according to the historical data of speech-sound scoring and the scoring result to calculate optimum adjusting weights for each layer of the hierarchical scoring structure;
   scoring retrieved speech-sound data of a student using a speech-sound scoring system; and
   performing a weighted average operation to the score of the speech-sound data of the student according to a corresponding adjusted weight, thereby generating the adjusted score of the speech-sound data of the student.

2. The adjustable hierarchical scoring method as claimed in claim 1, wherein optimum adjusted weights for each layer of the hierarchical scoring structure is calculated using an iterative least-squares method.

3. The adjustable hierarchical scoring method as claimed in claim 1, wherein the speech-sound data comprises sentences, words, syllables, and phonemes.

4. An adjustable hierarchical scoring system, comprising a processor to execute:
   a speech-sound scoring system, scoring retrieved speech-sound data of a student;
   a speech-sound practice database, storing historical data for the speech-sound data scored by the speech-sound scoring system;
   a weight database, storing calculated adjusted weights;
   a score input interface, retrieving a scoring result by a professional language instructor for a hierarchical scoring structure of the speech-sound data;
   a hierarchical weight-adjusting module, retrieving the historical data of speech-sound scoring for the speech-sound data from the speech-sound practice database and simultaneously collecting the scoring result for the hierarchical scoring structure of the speech-sound data, performing a weight-adjusting operation according to the historical data of speech-sound scoring and the scoring result to calculate optimum adjusting weights for each layer of the hierarchical scoring structure, and transmitting the calculated adjusted weights to the weight database; and
   a hierarchical weighting and scoring module, when speech-sound data of a student is retrieved, scoring the retrieved speech-sound data of the student using the speech-sound scoring system, selecting an adjusted weight corresponding to the speech-sound data of the student from the weight database, and performing a weighted average operation to the score of the speech-sound data of the student according to the selected adjusted weight, thereby generating the adjusted score of the speech-sound data of the student.

5. The adjustable hierarchical scoring system as claimed in claim 4, wherein the hierarchical weight-adjusting module calculates optimum adjusting weights for each layer of the hierarchical scoring structure using an iterative least-squares method.

6. The adjustable hierarchical scoring system as claimed in claim 4, wherein the speech-sound data comprises sentences, words, syllables, and phonemes.

7. A non-transitory computer-readable medium encoded with computer executable instructions for performing an adjustable hierarchical scoring method, wherein the computer executable instructions comprise:
   generating a hierarchical scoring structure for speech-sound data;
   retrieving historical data of speech-sound scoring for the speech-sound data from a speech-sound practice database while a scoring result by a professional language instructor for the hierarchical scoring structure of the speech-sound data is being collected;
   performing a weight-adjusting operation according to the historical data of speech-sound scoring and the professional scoring result to calculate optimum adjusting weights for each layer of the hierarchical scoring structure;
   scoring retrieved speech-sound data of a student using a speech-sound scoring system; and
   performing a weighted average operation to the score of the speech-sound data of the student according to a corresponding adjusted weight, thereby generating the adjusted score of the speech-sound data of the student.

* * * * *